Patented Jan. 18, 1949

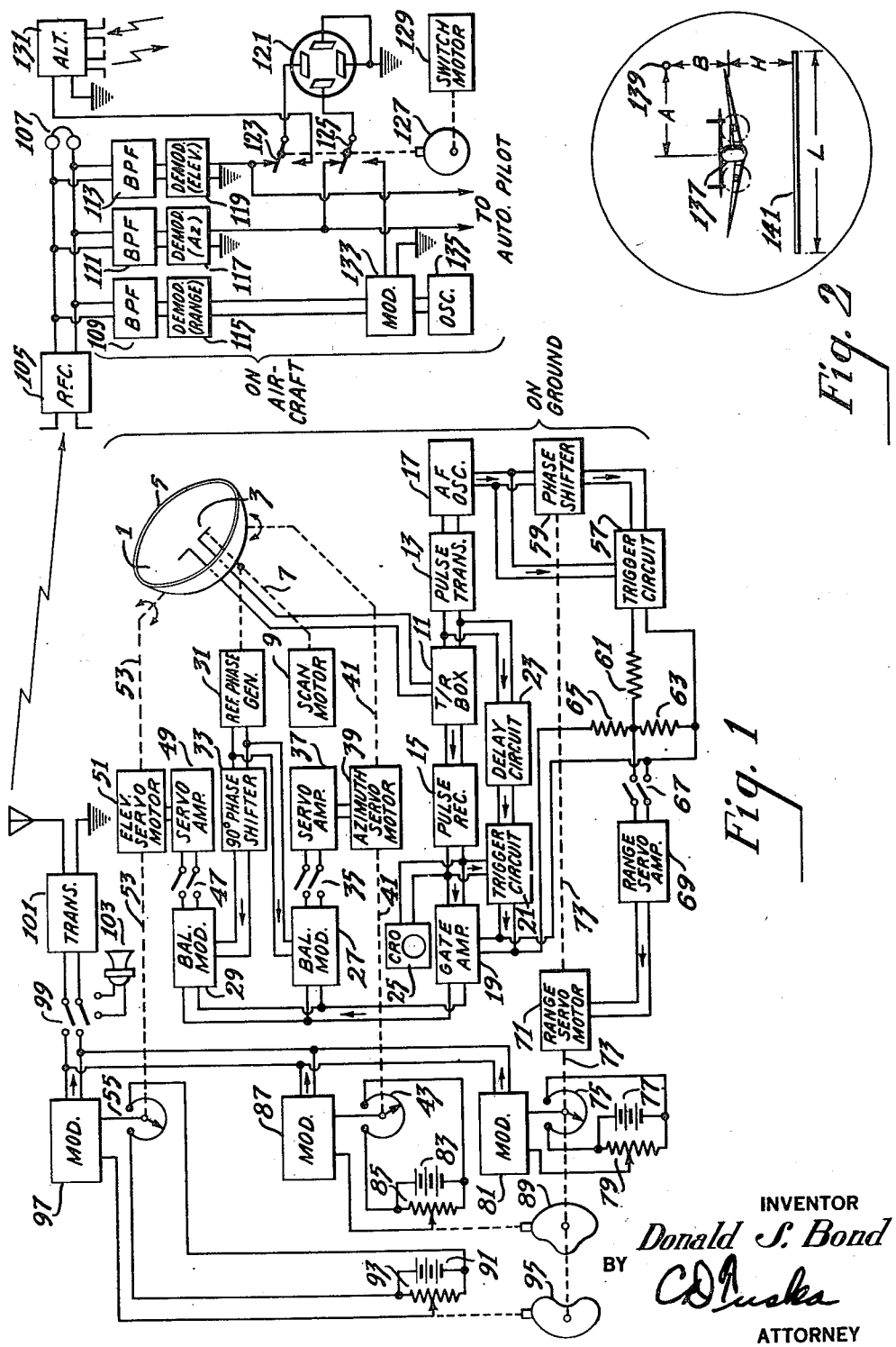

2,459,482

UNITED STATES PATENT OFFICE 2,459,482

INSTRUMENT LANDING SYSTEM

Donald S. Bond, Philadelphia, Pa., assignor to Radio Corporation of America, a corporation of Delaware Application November 30, 1945, Serial No. 632,061

7 Claims. (Cl. 343—6)

This invention relates to instrument landing systems for aircraft, and more particularly to improvements in the art of guiding an aircraft to a landing in response to control information obtained on the ground and transmitted to the aircraft.

The principal object of the present invention is to provide improved methods of and means for determining continuously the position of an aircraft with respect to a predetermined glide path, transmitting the information to the aircraft, and utilizing said transmitted information to provide indications on the craft, or automatic control thereof.

Another object is to provide a system of the described type wherein no complex equipment is required to be carried on the aircraft, the usual communication receiver being used to obtain position information from the ground station.

A further object is to provide an improved method of and means for transmitting position information from a ground station to an aircraft, and for converting the signals received on the aircraft to a continuously presented and readily interpretable visual indication.

The invention will be described with reference to the accompanying drawings, in which:

Figure 1 is a schematic diagram of one embodiment of the instant invention, and

Figure 2 is an illustration of a typical visual indication provided by the system of Figure 1.

In accordance with the present invention, a radio locator system is provided on the ground near the point at which landings are to be made. This system is used to locate and "track" or follow the aircraft, continuously providing information as to the position of the craft with respect to a predetermined glide path. This information is transmitted automatically by way of the usual radio communication channel to the aircraft, where it is converted to a visual indication and may also be employed for automatic control of the craft.

Locator and tracking system

Refer to Figure 1. A highly directional antenna 1 is supported on trunnions or the like (not shown) for rotation in both azimuth and elevation, like a search light. The antenna 1, in addition to being rotatable about vertical and horizontal axes, is arranged to "scan" continuously in a narrow conical pattern about its principal directive axis. This may be done by means of a radiator 3 disposed eccentrically with respect to the focal axis of a paraboloidal reflector 5 on a shaft 7, driven by a motor 9.

The antenna 1 is connected through a duplexing circuit or T/R box 11 to a pulse transmitter 13 and to a receiver 15. The T/R box includes a spark gap or glow tube which ionizes when the transmitter 13 operates, short-circuiting the input to the receiver 15.

The transmitter 13 is connected to an audio frequency oscillator 17, and provides a sharp pulse of radio frequency output in response to each cycle of the output of the oscillator 17.

The output circuit of the receiver 15 is connected to a gate amplifier 19. The amplifier 19 is normally biassed to cutoff, but may be made operative by means of a further bias applied to it from a trigger circuit 21. The trigger circuit 21 may be of the type described by Eccles and Jordan in Radio Review, volume 1, page 143 (1919), or a circuit of the quiescent multivibrator type. It includes one input circuit connected to the receiver 15, and a second input circuit connected through a delay network 23 to the transmitter 13.

Each pulse from the transmitter 13 throws the trigger circuit 21 to one condition, hereinafter called "on," after a short delay provided by the delay circuit 23, removing the cut off bias from the amplifier 19. Each pulse from the receiver 15 throws the trigger circuit 21 to its other stable condition, hereinafter called "off," again cutting off the amplifier 19. The delay produced by the network 23 is at least sufficient to prevent the amplifier 19 from being operative during the transmission of a pulse, and may be adjusted to cause rejection of received pulses reflected from nearby objects. Thus the amplifier 19 acts as a "gate" allowing only the desired received pulses to pass through. A cathode ray oscilloscope 25 is also connected to the output of the receiver 15, for monitoring and adjustment of the system.

The output circuit of the gate amplifier 19 is connected to a pair of balanced modulator circuits 27 and 29. A reference phase or alternator generator 31 is coupled to the antenna scanning shaft 7, providing one cycle for each rotation of the shaft. The alternator 31 is connected directly to the modulator 27, and through a 90° phase shifter 33 to the modulator 29.

The output circuit of the modulator 27 is connected through a switch 35 to a servo amplifier 37 which is in turn connected to a reversible azimuth servomotor 39. The servo amplifier 37 preferably includes means for preventing "hunting" of the motor 39, such as circuits of the type described in U. S. patent application Serial No. 481,395, filed April 1, 1943, patented October 21, 1947, Patent No. 2,429,257, by Donald S. Bond and entitled Remote control systems, and also includes a filter or other means to accept A.-C. components of the frequency of scanning and to attenuate other frequencies that may be present.

The motor 39 is provided with a shaft 41 for rotating the antenna 1 in azimuth. The motor 39 is also coupled to the movable tap of a variable voltage divider 43. The output circuit of the balanced modulator 29 is connected through a switch 47 to a second servo amplifier 49, similar to the amplifier 37, which is connected to an elevation servomotor 51. The motor 51 is provided with a shaft 53 for rotating the antenna 1 in elevation, and is coupled to an adjustable voltage divider 55.

The oscillator 17 is connected directly to one input of a trigger circuit 57, similar to the trigger circuit 21, and through a variable phase shifter 59 to the other input of the trigger circuit 57. The trigger circuit is turned on by the output of the oscillator 17 substantially coincidentally with each pulse from the transmitter 13, and is turned off by the output of the phase shifter 59, after a period determined by the adjustment of the phase shifter.

The output of the trigger circuit 57 is applied through a resistor 61 to a resistor 63. The output of the trigger circuit 21 is applied through a resistor 65 to the resistor 63. The connections of the trigger circuits 21 and 57 to the resistor 63 are such that their outputs oppose each other; i. e. when both trigger circuits are on, no voltage appears across the resistor 63, and when only one trigger is on, there is a voltage across the resistor 63, of polarity depending on which of the circuits 21 and 57 is on.

The resistor 63 is of low resistance compared to resistors 61 and 65, so there is substantially no coupling between the trigger circuits 21 and 57 and therefore the trigger 57 cannot control the gate amplifier 19. The resistor 63 is connected through a switch 67 to the input of an amplifier 69, similar to amplifier 37. The output of the amplifier 69 is applied to a reversible range servomotor 71. The motor 71 is provided with a shaft 73, coupled to the phase shifter 59 and to an adjustable voltage divider 75.

The operation of the system thus far described is as follows:

The oscillator 17 excites the transmitter 13 cyclically to provide a train of sharp pulses of high frequency energy, which are radiated by the antenna 1. A portion of the transmitted energy gets through the T/R box 11 to the receiver, producing a reference indication on the screen of the oscilloscope 25. Any aircraft which lie in the beam of the antenna 1 reflect back a portion of the transmitted energy, which also goes through the receiver 15, providing further indications whose relationship to the reference indication is a measure of the range.

Initially the switches 35, 47 and 67 are opened, and shafts 41 and 53 are rotated manually, or by manually controlled means, not shown, to train the antenna 1 on the aircraft which is to be guided to a landing. The shaft 73 is also rotated, under manual control, to a position corresponding to the range of the selected craft. The switches 35, 47 and 67 are then closed.

The trigger circuit 21 is turned on shortly after each pulse is transmitted, and is turned off in response to the reception of a pulse reflected from the aircraft, as described above. Thus the length of the period during which the trigger 21 is on is a measure of the distance of the craft from the antenna 1. The trigger 57 is similarly turned on with each cycle of the oscillator 17, and off after a period depending on the adjustment of the range shaft 73. Initially, the "on" periods of the two trigger circuits are equal and the resultant voltage across the resistor 63 is zero.

As the aircraft comes closer to the antenna 1, the delay between transmission and reception of each pulse becomes less, and the "on" periods of the trigger circuit 21 become correspondingly shorter. This causes a series of voltage pulses across the resistor 63, each of a duration equal to the difference in the "on" periods of the trigger circuits 21 and 57, and of polarity corresponding to that of the output of the trigger circuit 57. These voltage pulses are amplified in the amplifier 69, and energize the motor 71 to drive the range shaft 73 to reduce the amount of phase shift provided by the phase shifter 59. This action continues until the "on" periods of the two trigger circuits are again equal. The shaft 73 is thus maintained substantially continuously at a position corresponding to the range of the aircraft.

As stated above, the beam of the antenna 1 scans in a conical pattern. As long as the aircraft remains at the center of this pattern, the deviation of the beam from the craft will remain constant throughout the scanning cycle, and the amplitude of the received pulses will be independent of the instantaneous position of the beam. When the center of the scanning pattern does not coincide with the line from the antenna to the aircraft, the amplitude of the received pulses varies cyclically with the scanning, being greatest when the beam is directed toward the craft.

Thus the received pulses are amplitude modulated at the rotation frequency of the shaft 7. The phase of this modulation, with reference to the output of the alternator 31, depends on the direction in which the aircraft is away from the center of the scanning pattern. If the aircraft is to the right, for example, the pulse modulation will be in phase with the reference voltage from the generator 31. The gate amplifier 19 rejects the transmitted pulses, accepting and amplifying only the received pulses.

The modulator 27 responds to the reference voltage and the received pulses to provide an output including a component of the scanning frequency which is amplified in the amplifier 37 and applied to the motor 39. The output of the amplifier 37 is of such polarity as to energize the motor 39 to rotate the shaft 41 to turn the antenna 1 to the right. This recurs with each rotation of the scanning shaft 7 until the pattern is again centered on the aircraft. If the aircraft is to the left of the beam, the received pulses are modulated 180° out of phase with the reference voltage, the balanced modulator provides an output of opposite polarity, and the antenna is rotated to the left.

Similarly, if the craft is above or below the beam, the received pulses are modulated, but in quadrature phase with respect to the reference voltage. This provides no output from the modulator 27, but does produce output from the modulator 29, since it is in phase (or 180° out of phase) with the output of the 90° phase shifter 33. The modulator 29 controls the motor 51 in the same manner as the modulator 27 controls the motor 39, adjusting the antenna in elevation to center the scanning pattern on the aircraft.

Both of the above-described operations may take place simultaneously, or separately as required, maintaining the conical scanning pattern centered substantially continuously on the craft. The shaft 41 is thereby automatically at a position corresponding to the azimuth of the aircraft, and the shaft 53 is similarly maintained at a position corresponding to the elevation of the craft with respect to the location of the antenna 1.

Data transmission system

The voltage divider 75 is connected across a D.-C. source 77. A further voltage divider 79 is also connected across the source 77, and the taps of the voltage dividers 75 and 79 are connected to a modulator 81. The modulator 81 may be any known device for providing a signal which varies in some characteristic, such as amplitude or phase or frequency, in response to variations in magnitude of the D.-C. input from the voltage dividers 75 and 79. One such devise is shown in Theory and Applications of Electron Tubes, by H. J. Reich, 1st edition,, published by McGraw-Hill Book Company in 1939, in Figure 10—45, page 363. In this case the modulator 81 is an audio frequency oscillator whose frequency may be varied between the limits of 500 and 1000 cycles per second, for example, by variations of the D.-C. control voltage. Since the voltage between the taps of the voltage dividers 75 and 79 is a function of the angular position of the range shaft 73, the frequency of the output of the modulator 81 is a measure of the range.

The voltage divider 43 is connected like the voltage divider 75, to a D.-C. source 83 and a voltage divider 85. The taps of the voltage dividers 43 and 85 are connected to a modulator 87, like the modulator 81, but designed to operate over a different band of audio frequencies, for example 1500–2000 cycles per second. The voltage divider 85 is variable, with its movable tap mechanically coupled to a cam 89 on the range shaft 73. The frequency of the output of the modulator 87 is thus a function both of the range and the azimuth.

The voltage divider 55 is connected, like the voltage divider 43, to a D.-C. source 91 and a voltage divider 93. The voltage divider 93 is controlled by a cam 95 on the range shaft 73, and the taps of voltage dividers 55 and 93 are connected to a modulator 97. The modulator 97 is similar to modulators 81 and 87, but operates over a different band of frequencies, such as 2500 to 3000 cycles per second. The frequency of the output of the modulator 97 is a function both of the elevation and the range.

The output circuits of the modulators 81, 87 and 97 are connected through a switch 99 to a radio transmitter 101. The transmitter 101 is of the type ordinarily used for voice communication between aircraft and the ground station, and may be connected to a microphone 103 for this purpose by means of the switch 99.

A receiver 105 is provided on board the aircraft. The receiver 105 is of the usual voice communication type and is provided with transducer means such as headphones 107. Three band pass filters 109, 111, and 113 are connected to the output circuit of the receiver 105, and are designed to pass the bands corresponding to the outputs of modulators 81, 87 and 97 respectively.

The filter 109 is connected to a demodulator 115, designed to provide a D.-C. output corresponding to the D.-C. input to the modulator 81. In the present example, where the modulator 81 is a variable frequency device, the demodulator 115 is a frequency responsive circuit, such as a discriminator or cycle counter.

Demodulators 117 and 119, similar to the demodulator 115, are connected to the filters 111 and 113 respectively. These provide D.-C. outputs corresponding to the inputs to the modulators 87 and 97 respectively.

The operation of the described data transmission system is as follows:

The modulator 81 provides output of frequency corresponding to range, as described above. This signal is transmitted by way of the communication equipment to the aircraft, where it is demodulated to provide a signal corresponding to the range. The azimuth and elevation channels operate the same way, except for the effects of the cams 89 and 95.

Owing to the facts that the preferred glide path is not necessarily a straight line, and that the antenna 1 cannot be located at the desired point of contact of the aircraft with the surface, the angle of elevation of the glide path is a function of range. The cam 95 is designed in accordance with the required variation of elevation with range, so that the input to the modulator 97 is always the same regardless of range, when the aircraft is on the correct glide path.

Similarly, it may be necessary to locate the antenna 1 to one side of the glide path, rather than in line with the runway. This causes the azimuth to vary with range, and the variation is compensated by the cam 89. It will be apparent that if the antenna is in line with the runway, the cam 89 could be omitted and the voltage divider 85 could be fixed. Thus the inputs to the modulators 87 and 97, and hence the outputs of the demodulators 117 and 119, correspond to the azimuth and elevation of the aircraft with respect to the desired glide path, rather than with respect to a straight line through the antenna.

Converter and indicator system

A cathode ray oscilloscope 121 is provided on the aircraft, with conventional power supply means, focussing, intensity and beam centering adjustments, not shown. The vertical deflection circuit is connected to a double throw switch 123, and the horizontal deflection circuit is connected to a double throw switch 125. The switches 123 and 125 are mechanically ganged for cyclical operation by a cam 127 driven by a motor 129.

The demodulators 119 and 117 are connected to the upper fixed contacts of switches 123 and 125 respectively. The lower contact of the switch 123 is connected to an altimeter 131, preferably of the frequency modulation type, which provides a D.-C. output proportional in magnitude to the altitude of the aircraft.

The lower contact of the switch 125 is connected to the output of a modulator 133. The modulator 133 is connected to an oscillator 135, whose frequency is several times the frequency of operation of the switches 123 and 125. The output of the demodulator 115 is also applied to the modulator 133, in such polarity as to reduce the output of the modulator 133 in response to increase in output of the demodulator 115.

The operation of the convertor and indicator system is as follows:

When the switches 123 and 125 are in the upper position, the position of the cathode ray in the tube 121 is determined by the outputs of the azimuth and elevation channels. As long as the aircraft is on the glide path, the resultant spot on the screen of the cathode ray tube is at the center. If the craft is to the right of the glide path, the spot is deflected to the left. If the craft is above the glide path, the spot is deflected down. Refer to Figure 2. A fixed target 137 such as an outline of an airplane, is provided at the center of the screen of the cathode ray tube. A typical indication is shown, wherein the aircraft is below and to the left of the glide path, by the luminous spot 139. The horizontal distance A from the target 137 indicates the deviation in azimuth from the glide path. The vertical distance B similarly indicates the deviation in elevation.

When the switches 123 and 125 are in the lower position, the cathode ray beam is swept rapidly from side to side by the output of the modulator 133. This produces a luminous line 141 (Figure 2) on the screen. The output of the altimeter depresses the beam in accordance with the altitude, so that the distance H of the line 141 below the target 137 is a measure of the altitude. Since the output of the modulator 133 is controlled inversely by that of the range channel, the length L of the line 141 increases as the range decreases.

The switches 123 and 125 operate at a high enough rate to make both of the above-described indications appear to be present simultaneously. The pilot controls the aircraft to keep the spot centered on the target. The line 141 presents the appearance of a line on the ground, transverse to the runway, giving the illusion of perspective by increasing in length as the range decreases. As the glide path is followed to the ground, the line 141 rises with decrease in altitude, reaching the target 137 when the craft arrives at the point of contact. Thus a readily interpretable visual indication of the position of the aircraft is provided continuously on the cathode ray tube 121. The demodulators 117 and 119 may be connected to an automatic pilot mechanism, not shown, to guide the craft automatically to a landing.

The invention has been described as an instrument landing system for aircraft, wherein a radio locator system is provided at a ground station, with means for tracking an approaching aircraft. The elevation and azimuth of the craft are measured continuously, and their relationships to the desired glide path are computed and transmitted by radio to the aircraft. A convertor system on the aircraft provides deflection voltages for a cathode ray tube in response to the signals from the ground station, to produce a simple visual display of the position of the craft with respect to the glide path and the point of contact.

I claim as my invention:

1. An instrument landing system for aircraft including a ground station, a radio locator system at said ground station including means for determining substantially continuously the azimuth, elevation, and range of an aircraft, means responsive to said range information to modify said azimuth and said elevation information to provide modulation signals corresponding respectively to the deviation in azimuth and in elevation of said craft from a predetermined glide path, means responsive to said range information to provide a modulation signal corresponding to the range of said craft, a radio transmitter, and means for applying all of said modulation signals to said transmitter; a mobile station on said aircraft including a radio receiver responsive to said ground station transmitter to provide an output similar to the combined modulation input to said transmitter, means for separating and separately detecting the components of said output to provide signals corresponding respectively to the range of said craft from said ground station and to the deviation in azimuth and elevation of said craft with respect to said glide path, cathode ray oscilliscope means, means for applying intermittently said azimuth and elevation signals simultaneously to said oscilloscope to provide a visual indication of the position of said craft with respect to said glide path, and means for applying intermittently said range signal to said oscilloscope to provide visual indication of said range.

2. An instrument landing system for aircraft including a ground station, a radio locator system at said ground station including means for determining substantially continuously the azimuth, elevation, and range of an aircraft, means responsive to said range information to modify said azimuth and said elevation information to provide modulation signals corresponding respectively to the deviation in azimuth and in elevation of said craft from a predetermined glide path, means responsive to said range information to provide a modulation signal corresponding to the range of said craft, a radio transmitter, and means for applying all of said modulation signals to said transmitter; a mobile station on said aircraft including a radio receiver responsive to said ground station transmitter to provide an output similar to the combined modulation input to said transmitter, means for separating and separately detecting the components of said output to provide signals corresponding respectively to the range of said craft from said ground station and to the deviation in azimuth and elevation of said craft with respect to said glide path, cathode ray oscilloscope means, means for applying intermittently said azimuth and elevation signals simultaneously to said oscilloscope to provide a visual indication of the position of said craft with respect to said glide path, an altimeter including means providing a further signal corresponding to the altitude of said craft, and means for applying intermittently said range signal and altitude signal simultaneously to said oscilloscope to provide visual indication of said altitude and range.

3. An instrument landing system for aircraft including a ground station, a radio locator system at said ground station, said radio locator including a transmitter, a receiver, and a directive antenna, a follow-up system responsive to said receiver to maintain said antenna aligned in azimuth upon a selected aircraft, a second follow-up system responsive to said receiver to maintain said antenna aligned in elevation upon said craft, a range shaft, further follow-up means responsive to the relative timing of signals as transmitted by said transmitter and as received by said receiver to maintain said range shaft in a position corresponding to the distance of said craft from said ground station, means responsive to said range shaft and to said azimuth follow-up system to provide a modulation signal corresponding to the deviation in azimuth of said craft from a predetermined glide path, means responsive to said range shaft and to said elevation follow-up system to provide a second modulation signal corresponding to the deviation in elevation of said craft from said glide path, means responsive to said range shaft to provide a third modulation signal corresponding to the distance of said craft from said ground station, a radio communications transmitter, and means for applying all of said modulation signals to said communications transmitter; a mobile station on said aircraft including a radio receiver responsive to said ground station transmitter to provide an output similar to the combined modulation input to said transmitter, means for separating and separately detecting the components of said output to provide signals corresponding respectively to the range of said craft from said ground station and to the deviation in azimuth and elevation of said craft with respect to said glide path, cathode ray oscilloscope means, means for applying intermittently said azimuth and elevation signals simultaneously to said oscilloscope to provide a visual indication of the position of said craft with respect to said glide path, and means for applying intermittently said range signal to said oscilloscope to provide visual indication of said range.

4. An instrument landing system for aircraft including a ground station, a radio locator system at said ground station, said radio locator including a transmitter, a receiver, and a directive antenna, a follow-up system responsive to said receiver to maintain said antenna aligned in azimuth upon a selected aircraft, a second follow-up system responsive to said receiver to maintain said antenna aligned in elevation upon said craft, a range shaft, further follow-up means responsive to the relative timing of signals as transmitted by said transmitter and as received by said receiver to maintain said range shaft in a position corresponding to the distance of said craft from said ground station, means responsive to said range shaft and to said azimuth follow-up system to provide a modulation signal corresponding to the deviation in azimuth of said craft from a predetermined glide path, means responsive to said range shaft and to said elevation follow-up system to provide a second modulation signal corresponding to the deviation in elevation of said craft from said glide path, means responsive to said range shaft to provide a third modulation signal corresponding to the distance of said craft from said ground station, a radio communications transmitter, and means for applying all of said modulation signals to said communications transmitter; a mobile station on said aircraft including a radio receiver responsive to said ground station transmitter to provide an output similar to the combined modulation input to said transmitter, means for separating and separately detecting the components of said output to provide signals corresponding respectively to the range of said craft from said ground station and to the deviation in azimuth and elevation of said craft with respect to said glide path, cathode ray oscilloscope means, means for applying intermittently said azimuth and elevation signals simultaneously to said oscilloscope to provide a visual indication of the position of said craft with respect to said glide path, altimeter means providing a further signal corresponding to the altitude of said craft, and means for applying intermittently said range signal and said altitude signal to said oscilloscope to provide visual indication of said range.

5. An instrument landing system for aircraft including, at a ground station, a radio locator system including directive radio transmitter and receiver means, means for automatically maintaining the directive axis of said radio locator system in substantial alignment with a selected aircraft, means responsive to said last-mentioned means to derive substantially continuously information as to the azimuth and the elevation of said craft, means responsive to said locator system for deriving substantially continuously information as to the range of said craft, means responsive to said range information to modify said azimuth information and said elevation information in accordance with the characteristics of a predetermined glide path, means for converting said modified azimuth and elevation information and said range information into individually characteristic signals, means for transmitting said signals to said aircraft, and means on said aircraft responsive to said signals for providing indication of the deviation in flight of said craft from said glide path.

6. A system for guiding aircraft, including, at a ground station, a radio locator system providing substantially continuously information as to the direction and range of an aircraft from said ground station, means responsive to said range information to modify said direction information in accordance with the characteristics of a predetermined flight path, means for converting said modified direction information into characteristic signals, and means for transmitting said signals to said aircraft.

7. A system for guiding aircraft, including a radio locator system including directive radio transmitter and receiver means, follow-up systems responsive to the output of said receiver means to maintain the directive axis of said radio locator system in substantial alignment with a selected aircraft, two voltage sources and voltage control devices therefor responsive to said respective follow-up systems to provide respective voltages substantially proportional to the deviation vertically and horizontally respectively of an aircraft from a predetermined glide path, and a further follow-up system responsive to the time delay between transmission of a signal from said radio locator system and reception of said signal by said radio locator system after reflection by said aircraft to provide a voltage approximately inversely proportional to the range of said craft from a predetermined point on said path; a cathode ray oscilloscope including a fluorescent screen, a stationary target approximately at the center of said screen, and cathode ray deflection elements, a periodic switch connected to apply said first-mentioned voltages to said deflection elements to periodically deflect the cathode ray of said oscilloscope to produce a luminous spot at a point on said screen at a position with respect to said target corresponding to the positional relationship between said glide path and said craft, and to apply to said last-mentioned voltage to said deflection elements to periodically deflect said cathode ray to produce a luminous line on said screen corresponding inversely in length to the distance of said craft from said point.

DONALD S. BOND.

REFERENCES CITED

The following references are of record in the file of this patent:

UNITED STATES PATENTS

| Number | Name | Date |
|---|---|---|
| 1,999,047 | Hahneman | Apr. 23, 1935 |
| 2,134,132 | Koster | Oct. 25, 1938 |
| 2,309,314 | Harshaw | Jan. 26, 1943 |
| 2,372,620 | Williams | Mar. 27, 1945 |
| 2,395,854 | Ferrill | Mar. 5, 1946 |
| 2,409,456 | Tolson | Oct. 15, 1946 |
| 2,415,981 | Wolff | Feb. 18, 1947 |
| 2,416,591 | Muntz | Feb. 25, 1947 |
| 2,417,248 | Godet | Mar. 11, 1947 |